US011055411B2

(12) United States Patent
Strogov et al.

(10) Patent No.: US 11,055,411 B2
(45) Date of Patent: Jul. 6, 2021

(54) SYSTEM AND METHOD FOR PROTECTION AGAINST RANSOMWARE ATTACKS

(71) Applicant: Acronis International GmbH, Schaffhausen (CH)

(72) Inventors: Vladimir Strogov, Moscow (RU); Vyacheslav Levchenko, Moscow (RU); Alexey Dod, Moscow (RU); Serguei Beloussov, Costa del Sol (SG); Stanislav Protasov, Moscow (RU); Anatoly Stupak, Moscow (RU); Valery Chernyakovsky, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 117 days.

(21) Appl. No.: 16/406,568

(22) Filed: May 8, 2019

(65) Prior Publication Data
US 2019/0347418 A1 Nov. 14, 2019

Related U.S. Application Data

(60) Provisional application No. 62/669,489, filed on May 10, 2018.

(51) Int. Cl.
*G06F 21/56* (2013.01)
*H04L 29/06* (2006.01)
(Continued)

(52) U.S. Cl.
CPC .......... *G06F 21/568* (2013.01); *G06F 16/128* (2019.01); *G06F 21/566* (2013.01);
(Continued)

(58) Field of Classification Search
CPC .... G06F 21/568; G06F 16/128; G06F 21/566; G06F 2221/034; G06F 21/554;
(Continued)

(56) References Cited

U.S. PATENT DOCUMENTS 8,108,935 B1 * 1/2012 Sobel ................. G06F 21/6218
726/26
8,528,086 B1 * 9/2013 Aziz ................... H04L 63/0245
726/23

(Continued)

*Primary Examiner* — Aravind K Moorthy
(74) *Attorney, Agent, or Firm* — Arent Fox LLP; Michael Fainberg

(57) ABSTRACT

A method is provided for protecting a file server from a ransomware attack. An exemplary method comprises assigning a session identifier to a remote session initiated with the file server, monitoring operations associated with the session identifier, determining whether the operations are suspicious according to a policy, creating a volume-level snapshot of files on the file server, determining that encryption of the data is occurring when entropy of the monitored data is growing faster than the predetermined threshold rate, classifying the remote session as having a calculated degree of danger when the operations match operations contained in previously observed suspicious behavior patterns, interrupting the remote session when a combination of the degree of danger and the entropy is greater than a predetermined threshold value and restoring the data on the file server using the volume-level snapshot to a state prior to the encryption and dangerous activity.

21 Claims, 5 Drawing Sheets

(51) Int. Cl.
*G06N 20/00* (2019.01)
*G06F 16/11* (2019.01)

(52) U.S. Cl.
CPC ............ *G06N 20/00* (2019.01); *H04L 63/101* (2013.01); *H04L 63/145* (2013.01); *G06F 2221/034* (2013.01)

(58) Field of Classification Search
CPC ..... G06F 21/44; G06F 16/122; H04L 63/101; H04L 63/145; H04L 63/1425; H04L 63/1466; G06N 20/00
See application file for complete search history.

(56) References Cited

U.S. PATENT DOCUMENTS

| | | | | |
|---|---|---|---|---|
| 8,856,927 | B1* | 10/2014 | Beloussov | G06F 21/53 726/23 |
| 8,984,110 | B1* | 3/2015 | Asveren | H04L 65/1083 709/223 |
| 9,092,625 | B1* | 7/2015 | Kashyap | G06F 9/45558 |
| 9,262,642 | B1* | 2/2016 | Roth | G06F 21/62 |
| 9,363,232 | B1* | 6/2016 | Adams | H04L 67/14 |
| 9,405,756 | B1* | 8/2016 | Xavier | G06F 16/128 |
| 9,503,257 | B2* | 11/2016 | Tanizawa | H04L 9/0858 |
| 9,516,053 | B1* | 12/2016 | Muddu | G06N 5/04 |
| 9,635,011 | B1* | 4/2017 | Wu | H04L 9/0861 |
| 9,813,443 | B1* | 11/2017 | Subramanian | G06F 21/561 |
| 10,121,003 | B1* | 11/2018 | Adams | G06F 21/565 |
| 10,229,269 | B1* | 3/2019 | Patton | G06F 21/602 |
| 10,503,904 | B1* | 12/2019 | Singh | G06F 21/561 |
| 2003/0081769 | A1* | 5/2003 | Hamilton | H04N 1/32208 380/28 |
| 2003/0212920 | A1* | 11/2003 | Fujibayashi | G06F 11/1466 714/6.32 |
| 2004/0179682 | A1* | 9/2004 | Soliman | H04L 9/0822 380/44 |
| 2004/0179685 | A1* | 9/2004 | Soliman | H04L 9/3273 380/44 |
| 2004/0179690 | A1* | 9/2004 | Soliman | H04L 9/3273 380/277 |
| 2005/0005156 | A1* | 1/2005 | Harper | H04L 9/3247 726/26 |
| 2005/0198501 | A1* | 9/2005 | Andreev | H04L 63/0815 713/168 |
| 2006/0036676 | A1* | 2/2006 | Cardone | H04L 29/08072 709/203 |
| 2006/0062384 | A1* | 3/2006 | Dondeti | H04L 9/0869 380/44 |
| 2006/0143454 | A1* | 6/2006 | Walmsley | G06F 21/85 713/170 |
| 2007/0100905 | A1* | 5/2007 | Masters | G06F 21/568 |
| 2007/0204342 | A1* | 8/2007 | Markovich | G06F 16/24565 726/23 |
| 2008/0095370 | A1* | 4/2008 | Rose | H04L 9/0662 380/278 |
| 2008/0120676 | A1* | 5/2008 | Morad | H04N 21/42607 725/127 |
| 2011/0066850 | A1* | 3/2011 | Ekberg | H04W 12/02 713/162 |
| 2011/0099633 | A1* | 4/2011 | Aziz | H04L 63/1408 726/24 |
| 2011/0173696 | A1* | 7/2011 | Dynes | H04L 9/0858 726/22 |
| 2011/0314304 | A1* | 12/2011 | Braams | G06F 21/79 713/193 |
| 2012/0331553 | A1* | 12/2012 | Aziz | G06F 21/554 726/23 |
| 2013/0074183 | A1* | 3/2013 | Yoon | G06F 21/00 726/22 |
| 2013/0138765 | A1* | 5/2013 | Fielding | H04L 63/10 709/217 |
| 2013/0226791 | A1* | 8/2013 | Springer | G06Q 40/12 705/41 |
| 2014/0325616 | A1* | 10/2014 | Dolph | G06F 16/128 726/5 |
| 2014/0331062 | A1* | 11/2014 | Tewari | G06F 21/6245 713/189 |
| 2015/0058987 | A1* | 2/2015 | Thure | G06F 21/565 726/23 |
| 2015/0086013 | A1* | 3/2015 | Metzler | H04L 9/0618 380/210 |
| 2015/0188701 | A1* | 7/2015 | Nordholt | H04L 9/0852 713/171 |
| 2015/0382230 | A1* | 12/2015 | Miklos | H04W 28/0205 370/230 |
| 2016/0014149 | A1* | 1/2016 | Bradley | H04L 63/1425 726/14 |
| 2016/0036839 | A1* | 2/2016 | Shimizu | H04L 63/1416 726/23 |
| 2016/0170838 | A1* | 6/2016 | Erickson | G06F 16/128 711/162 |
| 2016/0328211 | A1* | 11/2016 | Nordholt | G06F 7/588 |
| 2016/0337400 | A1* | 11/2016 | Gupta | H04L 63/02 |
| 2016/0364707 | A1* | 12/2016 | Varma | G06F 21/50 |
| 2016/0366155 | A1* | 12/2016 | El-Moussa | H04L 63/145 |
| 2017/0085654 | A1* | 3/2017 | Mikhailov | G06F 7/58 |
| 2017/0099307 | A1* | 4/2017 | Xu | H04L 63/1425 |
| 2017/0223032 | A1* | 8/2017 | El-Moussa | H04L 63/1425 |
| 2017/0289109 | A1* | 10/2017 | Caragea | H04L 63/166 |
| 2018/0018458 | A1* | 1/2018 | Schmugar | G06F 21/566 |
| 2018/0075239 | A1* | 3/2018 | Boutnaru | G06F 21/60 |
| 2018/0083958 | A1* | 3/2018 | Avilov | H04L 63/083 |
| 2018/0114020 | A1* | 4/2018 | Hirschberg | G06F 21/566 |
| 2018/0115523 | A1* | 4/2018 | Subbarayan | H04L 63/1425 |
| 2018/0115566 | A1* | 4/2018 | Azvine | G06F 17/141 |
| 2018/0115567 | A1* | 4/2018 | El-Moussa | G06F 17/141 |
| 2018/0121650 | A1* | 5/2018 | Brown | G06F 21/561 |
| 2018/0129476 | A1* | 5/2018 | Wesson | G06F 21/554 |
| 2018/0159866 | A1* | 6/2018 | Sheri | G06F 21/566 |
| 2018/0183823 | A1* | 6/2018 | Fadlil | G16H 20/30 |
| 2018/0212766 | A1* | 7/2018 | Greenspan | G06F 21/10 |
| 2018/0212987 | A1* | 7/2018 | Tamir | H04L 63/1425 |
| 2018/0307839 | A1* | 10/2018 | Bhave | G06F 21/56 |
| 2019/0012457 | A1* | 1/2019 | El-Moussa | G06F 21/50 |
| 2019/0068362 | A1* | 2/2019 | Anderson | H04L 63/0428 |
| 2019/0109869 | A1* | 4/2019 | Bailey | H04L 63/1416 |
| 2019/0116030 | A1* | 4/2019 | Wiacek | H04L 9/0894 |
| 2019/0130097 | A1* | 5/2019 | Berler | G06F 21/567 |
| 2019/0158512 | A1* | 5/2019 | Zhang | H04L 63/145 |
| 2019/0171823 | A1* | 6/2019 | Maluf | G06F 21/577 |
| 2019/0228148 | A1* | 7/2019 | Pohl | G06F 21/554 |
| 2019/0303572 | A1* | 10/2019 | Chelarescu | H04L 63/1441 |
| 2020/0050760 | A1* | 2/2020 | El-Moussa | H04L 63/1408 |

* cited by examiner

SYSTEM AND METHOD FOR PROTECTION AGAINST RANSOMWARE ATTACKS

CROSS-REFERENCE TO RELATED APPLICATIONS

This application claims the benefit of priority of U.S. Provisional Application No. 62/669,489 filed on May 10, 2018, the contents of which are herein incorporated by reference in their entirety.

TECHNICAL FIELD

The present disclosure generally relates to the field of computer system security, and more particularly, to a system and method for protection against ransomware attacks.

BACKGROUND

The typical threats posed to endpoint computers and computer networks include malicious software (sometimes referred to as "malware" or "ransomware") which hijacks a computer's resources until the user or owner of the computer pays a "ransom" to a hacker. Only then does the hacker release the data or resources. In some instances, a hacker may merely hijack the resources, demand a ransom, and refuse to release the resources. For example, if the user's personal data has been encrypted, the hacker may not decrypt the data or give the user the ability to decrypt the data. Some additional threats are specifically directed at file and storage servers. For example, ransomware has been developed that encrypts files on storage controlled by the file server. This encryption prevents any regular users or applications from accessing the files they may need to use. Similarly, the ransomware can encrypt any shared resources such as shared folders, disks, partitions, or the like. Such types of ransomware can differ vastly in their implementation from one version to the next, depending on which platform they target or which type of method they use to obtain access to the file server, making it difficult to adequately protect the file server.

Accordingly, a system and method is needed that provides protection for the file server against ransomware attacks of various types.

SUMMARY

Thus, a system and method is disclosed herein for protecting a file server from a ransomware attack.

An exemplary method comprises assigning a session identifier to a remote session initiated with the file server, monitoring operations on the file server associated with the session identifier, determining whether the operations comprise any operations that are suspicious according to a policy, creating a volume-level snapshot of files on the file server when the operations on the file server comprise any operations that are deemed suspicious, determining that encryption of the data is occurring when entropy of the monitored data is growing faster than the predetermined threshold rate, classifying the remote session as having a calculated degree of danger when the operations match operations contained in previously observed suspicious behavior patterns identified using machine learning applied to operations on the file server over a predetermined period of time, interrupting the remote session when a combination of the degree of danger and the entropy is greater than a predetermined threshold value and restoring the data on the file server using the volume-level snapshot to a state prior to the encryption and dangerous activity.

In one aspect, the method further comprises determining the file operations suspicious when the operations comprise one or more of modifying data on the file server, deleting data on the file server, and/or encrypting data on the file server.

In one aspect, the method further comprises adding a user identifier (user Id) of a user initiating the remote session to a black list and blocking future sessions associated with the user Id from initiating a session with the file server.

In one aspect, the method further comprises adding an IP address of a client device in combination with the user Id to the black list.

In one aspect, the method further comprises weighting the degree of danger at a first predetermined weight and the determination of encryption at a second predetermined weight, and determining the combination for interrupting the session based on the degree of danger at the first predetermined weight and the entropy level at the second predetermined.

In one aspect, the method further comprises collecting an event chain based on the operations, and generating a entropy behavior pattern according to the event chain.

In one aspect, the method further comprises wherein classifying the remote session further comprises comparing the observed behavior pattern in the remote session with stored behavior patterns and determining a classification of the behavior patterns based on a classification of a similar behavior pattern from the stored behavior patterns.

In one aspect, the method further comprises wherein determining whether the operations comprise operations that are suspicious according to a policy further comprises generating a first classification of the operations based on a trained model of bad applications and generating a second classification of the operations based on a trained model of good applications.

In one aspect, the method further comprises generating a third classification of the operations as dangerous based on an entropy comparison with a previous state of data affected by the operations, wherein the entropy comparison indicates an increase in entropy of the data.

In one aspect, the method further comprises verifying the first classification and the second classification based on the third classification An exemplary system comprises a processor configured to assign a session identifier to a remote session initiated with the file server, monitor operations on the file server associated with the session identifier, determine whether the operations comprise any operations that are suspicious according to a policy, create a volume-level snapshot of files on the file server when the operations on the file server comprise any operations that are deemed suspicious, determine that encryption of the data is occurring when entropy of the monitored data is growing faster than the predetermined threshold rate, classify the remote session as having a degree of danger when the operations match operations contained in previously observed suspicious behavior patterns identified using machine learning applied to operations on the file server over a predetermined period of time, interrupt the remote session when a combination of the degree of danger and the entropy is greater than predetermined threshold value and restore data on the file server using the volume-level snapshot to a state prior to the encryption and dangerous activity.

An exemplary non-transitory computer-readable medium is provided, storing instructions thereon for protecting a file server from a ransomware attack, the instructions comprising assigning a session identifier to a remote session initiated with the file server, monitoring operations on the file server associated with the session identifier, determining whether the operations comprise any operations that are suspicious according to a policy, creating a volume-level snapshot of files on the file server when the operations on the file server comprise any operations that are deemed suspicious, determining that encryption of the data is occurring when entropy of the monitored data is growing faster than the predetermined threshold rate, classifying the remote session as having a calculated degree of danger when the operations match operations contained in previously observed suspicious behavior patterns identified using machine learning applied to operations on the file server over a predetermined period of time, interrupting the remote session when a combination of the degree of danger and the entropy is greater than a predetermined threshold value and restoring the data on the file server using the volume-level snapshot to a state prior to the encryption and dangerous activity.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects are described herein in the context of a system, method, and computer program product for deploying a distributed computing system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
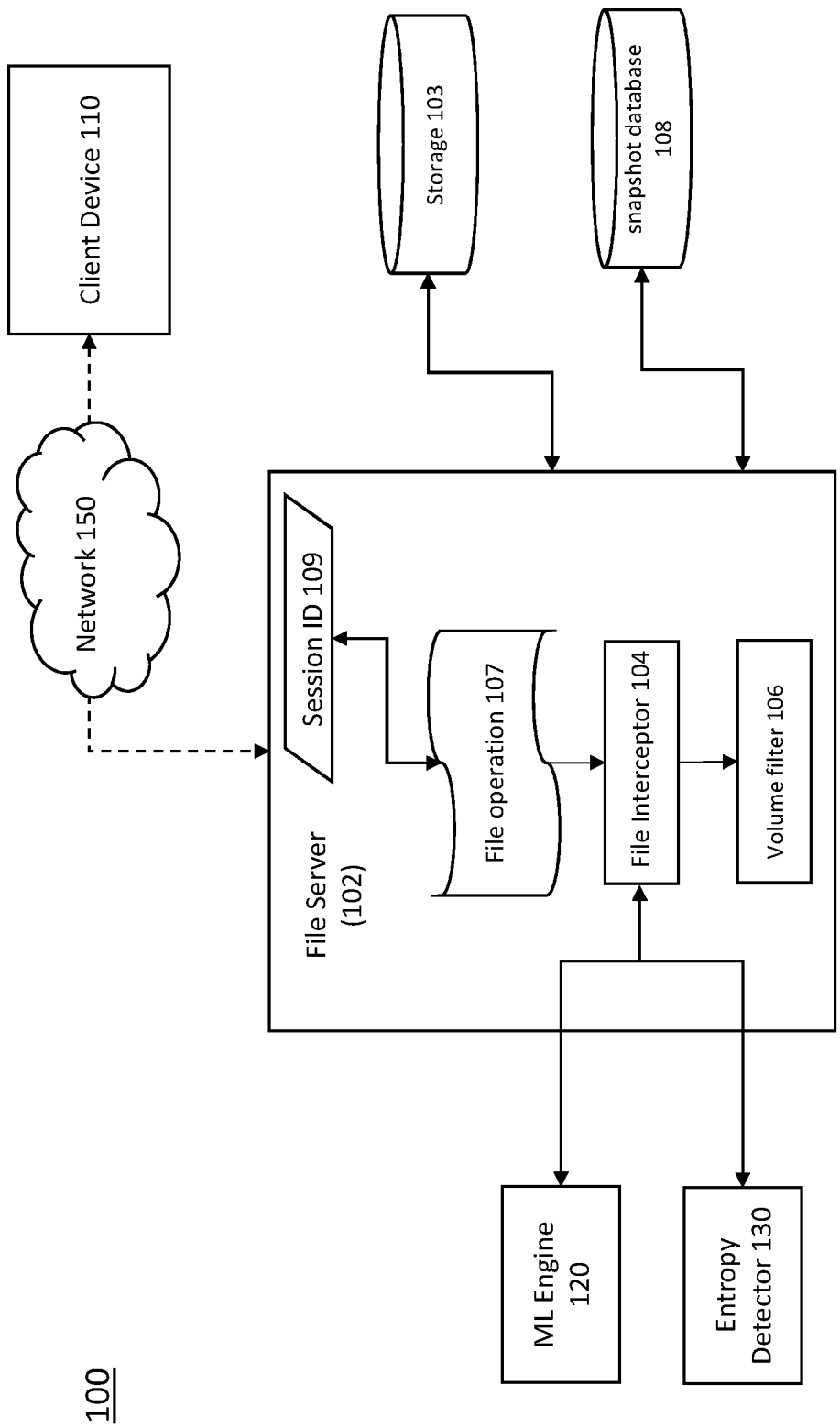
FIG. 1 is a block diagram of a system for protecting a file server from ransomware attacks according to exemplary aspects of the present disclosure.

FIG. 1 is a block diagram of a system 100 for protecting a file server from ransomware attacks according to exemplary aspects of the present disclosure.

The system 100 comprises a file server 102, a machine learning (ML) engine 120 and an entropy detector 130. The ML engine 120 performs machine learning on sessions with the file server 102 to continuously improve the detection of malicious files or sessions by monitoring operations and their effects on the file server 102. The entropy detector 130 detects suspicious operations or files during the session by monitoring entropy of files on the file server 102. The file server 102 comprises file interceptor 104 and volume filter 106. The file interceptor 104 monitors and tracks file operations 107 and writes snapshots of the file server disk storage to the snapshot database 108 during each session according to a predetermined or dynamic schedule.

In some aspects, the file server 102 may be a single computer or a network of computers that handles requests to perform operations on objects, files, and other electronic data. Operations may include accessing the data, storing the data, modifying the data, deleting the data, and encrypting (cipher) the data, among others. According to one aspect, the file server 102 may be a controller for one or more storage devices 103 where data is stored. The storage devices 103 may be local or remote to the file server 102. According to one aspect, both the file server 102 and the storage devices 103 may be implemented using cloud technologies, distribute computing and the like. In other words, components of the file server 102 and storage components of the storage devices 103 may be distributed across several physical devices and/or networks. Each of the components of the system 100 are configured to protect the file server 102 from malicious attacks by software, such as ransomware, from encrypting or otherwise holding the files on file server 102 ransom at the behest of a hacker.

In an exemplary aspect, the file server 102, the storage 103 or the snapshot database 108 can be a cloud-based storage service, e.g. components of the various portions of system 100 may be implemented using Amazon® Simple Storage Service ("S3"), and Microsoft® Azure ("Azure"), though other configurations are also contemplated by the aspects described herein. In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

In an exemplary aspect, the system 100 comprises an ML engine 120 and an entropy detector 130, both components used cooperatively to detect ransomware. In one aspect, ML engine 120 observes interactions (e.g., file operations) of client devices with the file server 102 during a remote session and uses machine learning to determine if patterns of behavior of users and the file server indicate that the user or behavior is "malicious", or in other words, an attempt to perform operations that would damage the data, prevent users from accessing their data, or otherwise unacceptably modify the data. The ML engine 120 may also determine that the user or behavior is "non-malicious", or in other words, not an attempt to perform malicious activities. In one aspect, the ML engine 120 observes behavior, then classifies the behavior as malicious or not malicious. The classification by the ML engine 120 may be verified later, and used to improve future classifications. As more behaviors, files, operations or the like are observed, the ML engine 120 improves upon classification by applying the verified, or corrected classification rules to new data. In this respect, the ML engine 120 improves over time and the classifications become more accurate and trustworthy.

In some aspects, the entropy detector 130 monitors files stored on the storage devices 103 exposed via the file server 102. The entropy detector 130 continuously calculates entropy of the monitored data and upon detection of an increase of entropy in the monitored data during a session between a client device 110 and file server 102, the entropy detector 130 may classify this pending session as "dangerous" (e.g., malicious) or "safe" (i.e., non-malicious), or varying degrees between malicious and safe in one aspect of the disclosure. While the entropy detector 130 can successfully detect suspicious programs, or files based on an increase in entropy, the entropy detector 130 cannot give a conclusion regarding "good" or, non-malicious, programs because sessions in which entropy remains relatively stable may still be malicious, but those in which entropy increases, for example past a particular threshold, or faster than a predetermined rate, are very likely to be malicious. In contrast, the ML engine 120 uses training models that are trained on both "good" and "bad" programs, and can positively classify these files as malicious or non-malicious. The ML engine 120 and the entropy detector 130 are complementary in classifying the remote session as dangerous or as safe. The entropy detector 130 is able to detect or determine a potential for encryption and supplements the classification of the ML engine 120.

The system 100 makes a decision of dangerous or safe regarding the user session based on input from the ML engine 120 and the entropy detector 130. In some aspects, the decisions from the ML engine 120 and the entropy detector 130 each may be weighted based on predetermined weighting preferences established by an administrator of the system 100. In other aspects, the weighting may be established using the ML engine 120 based on previous classification results, false positives, and system performance or the like, though other bases are also contemplated. Once the system 100 makes a decision about this monitored remote session determining that it is dangerous, the file server 102 may forcibly interrupt the remote session with the client device 110. If the remote session is secure, the remote session is permitted to continue. In one example, in Windows, the "NetSessionDel" system function may be used to interrupt the remote session. When the session is classified as "safe" by the ML engine 120 and the entropy detector 130, the file server session tracking and snapshot creation of modified files are suspended or terminated to free up resources on the file server 102.

In some additional aspects, the IP address of the remote user or client device that was suspected of malicious activity may also be blocked. This allows the prevention of repeated sessions from the user. The file server 102 adds the IP-address to the device to a black-list of IP addresses, and reconnection from that IP address is no longer permitted. In another aspect, a combination of the IP Address, user identifier (e.g., a user ID such as a SID in Windows®) and other available information such as the ID of the client application in order to successfully block a user or client device. This combination of pieces of information prevent against those that may use proxy to access the file server 102. In another aspect, modifiable access to system resources is prevented from repeated sessions instead of blocking a connection itself. In another aspect, the client may be added to a list of suspicious clients and an enhanced analysis will be applied for future connections, where the enhanced analysis may classify clients based on stricter policies.

According to one aspect, client device 110 is a user device such as a laptop, a home desktop, a mobile device, a tablet computer, or the like. When attempting to retrieve, modify, delete or save a file, the client device 110 may send a file operation request to the file server 102 to perform such file operations 107. The file server 102 handles all such requests by clients. In some cases, the client device 110 may have been hijacked by ransomware that may be attempting to encrypt (or perform some other malicious operation upon) files controlled by the file server 102 to extract a ransom from an ordinary user of the client device 110.

Once the client device 110 has established a remote session with the file server 102 after authorization (for example, using Windows domain authorization, Active Directory, or the like), the file server 102 assigns this session a special system identifier (e.g., an SID in Windows) which is a secure identifier retrieved by an impersonation token in Windows®. The file server also creates a session identifier (session Id) 109 corresponding to the remote session. According to one aspect, the session Id 109 exists for a single session, while a system identifier (e.g., an SID in Windows) is permanent. All file operations 107 that are performed by the client device 110, whether through user direction or not, will be tagged with the session Id 109. Thus the file server 102 can observe, track and log all of the activities performed in a particular remote session. In some aspects, session ID defines and/or identifies the network connection/session and SID (e.g., a user ID or system ID as described above for non-WINDOWS based computer systems) defines the user or system on behalf of whom the actions are taken. User ID alone is not sufficient because it can operate outside the Session ID context too.

After authorization and generation of the SID and the session Id 109, the file server 102 initiates tracking using the file interceptor 104. The file interceptor 104 is configured to track contents of each file prior to modification. In some aspects, to avoid excessive load on the file server 102, the file interceptor 104 may limit tracking only to those files accessible by the user of client device 110 based on permissions. In other aspects, the file interceptor 104 only tracks data identified as vulnerable. According to this aspect, vulnerability may be identified by an administrator of the file server 102, based on statistical information provided by a third party, or vulnerability may be the result of a recurring pattern of access and attack at the file server 102. In other words, the file server 102 may be configured to learn behaviors, patterns and files that are vulnerable so that the file interceptor 104 can conserve resources by only tracking the files that are vulnerable. According to one aspect, the file interceptor 104 tracks files based on configured policies. One policy may indicate, for example, that the files to be tracked include those files that are vulnerable such as user data files (e.g., office documents, video, audio, images and the like). The policies may include file paths and names, file extensions, or the like for identifying vulnerable data. Additionally, the file interceptor 104 also takes snapshots (file, volume snapshots and/or volume-level snapshots in one aspect) of the tracked data during the session that are stored in snapshot database 108. If the session is ultimately classified as being dangerous, snapshots can be retrieved from snapshot database 108 by the file interceptor 104 to restore the tracked data to a state prior to being modified or hijacked by ransomware, thus immunizing the file server 102 from malicious ransomware attacks.

In one aspect, the file interceptor 104 may observe and transmit any information on the events performed during the session to the ML engine 120 and the Entropy detector 130 for analysis. As described earlier, the ML engine 120 creates an "event chain" for each set of events that are received. Over time, the ML engine 120 identifies and recognizes problematic event chains that are characteristic of dangerous user behavior faster based on previously received, analyzed and classified data. The ML engine 120 can calculate a degree of danger of the remote session based on applying currently observed behavior to the previously stored and analyzed behavior. The speed at which the ML engine 120 can make a dangerous/safe determination increases with the amount of data that the ML engine 120 has analyzed. According to one aspect, heuristics used in the classification include patterns of full file read, combined delete and create operations, renaming special file extensions, MIME type changes as the result of file write operations and the like. These operations, when encountered, contribute to the classification of a session has dangerous, malicious, unsafe or the like. In exemplary aspects, full-read, delete and create as a heuristic in classification accounts for matching create operations for the full read and delete operation pairs in order to reduce false positives.

Moreover, in one aspect the file server 102 comprises a volume filter 106 which detects suspicious changes that occur on one or more volumes of the file server 102. The volume filter 106 provides volume-level snapshots of files that existed at a certain point in time in the system 100. For example, the volume filter 106 may track and process changes by a "copy-on-write" functionality at the volume level, but only for the sectors on the volumes of compromised/attacked files.

The entropy detector 130 may evaluate the entropy change of tracked data regions and tracked files. In one aspect, the entropy detector 130 monitors the increase of entropy in tracked data related to the event chain, or generally related to the user initiating the remote session. Growth in entropy can be a sign of malicious activity such as ransomware and the like. In some aspects, if the growth exceeds a particular threshold growth rate, then the entropy detector 130 may classify the session or event chain as potentially being affected by ransomware encryption software. Alternatively, the threshold growth rate may be dynamically modified as the entropy detector 130 accumulates more data over time. In one aspect, entropy level change is calculated per file, per remote session. In another aspect, entropy is measured per file threshold, e.g., a change of a particular amount of files associated with a user, or session, from a low entropy to a high entropy. In yet another aspect, entropy can be measured per session threshold: for example, if per file entropy threshold is reached a predetermined number of times (e.g., 5) within a predefined time period (e.g. 5 minutes), then the entropy detector 130 may classify the session, client and/or user as potentially containing or execution malicious encryption software.

The entropy information for monitored data in the event chain enables the entropy detector 130 to classify a session as dangerous only, but not as safe, because high entropy (by comparison with a previous data state) only indicates the potential of encryption. If the entropy detector 130 determines that there is no potential for encryption in the session, a file/session or the like, still may or may not be suspicious. However, there is not enough information to reach such a conclusion. When an increase in the entropy of files is observed over previous sessions and/or as the session progresses, the entropy detector 130 can classify the session or the user as dangerous. In one aspect, the entropy helps verify or strengthen the verdict of the ML engine 120 regarding a session being dangerous or safe.

The entropy detector 130 can provide positive information regarding the high entropy level, which is characteristic for encryption or compression. As a result, when entropy is above a threshold or threshold rate, there is a high chance that encryption is in progress during the session on the file server 102. A low level of entropy (e.g., below a determined threshold) likely indicates the absence of encryption activities. During a remote session, entropy levels may be low, resulting in the entropy detector 130 being unable to identify dangerous activity. Thus, the additional input of the ML engine 120 will aid classifying a remote session on the file server 102 as dangerous or safe.

In one aspect, the file server 102 may determine whether a session is classified as dangerous or safe, based on a combination of the determinations of the ML engine 120 (e.g., the degree of danger) and the entropy detector 130 (e.g., the entropy or encryption level). In some aspects, the determinations from the ML engine 120 and the entropy detector 130 can be weighted according to an algorithm, or predetermined based on resource conditions on the file server 102. Alternatively, the weighting can be determined according to patterns of success determined by both the ML engine 120 and the entropy detector 130. In another aspect, the weighting can be dynamically adjusted based on system conditions such as file server resources, details related to the event chain which may favor the ML engine 120 determination or the entropy detector 130 determination, or the like. In some aspects, system conditions and resources may influence weighting determinations of the ML engine 120 more than the determinations of the entropy detector 130, or in other words, changed behavior patterns due to system conditions can affect determinations by the ML engine 120.

Once the file server 102 has determined that the session is dangerous or safe, the file server 102 may act accordingly. For example, if the session is classified as dangerous, the session may be forcibly interrupted. According to one aspect of the disclosure, the file server 102 may be using WINDOWS as the operating system, where for example the "NetSessionDel" system function is used to interrupt sessions. Alternatively, if the session is classified as safe, the file server 102 stops tracking the session and stops creating snapshots for data which is accessed or modified in the session. In some instances, the file server 102 retains a particular low level of tracking that enables the determination of suspiciousness regarding malicious activity. If the suspicious activity reaches or exceeds a predetermined threshold, the file server 102 may restart tracking and monitoring in order to classify the session as dangerous or safe. According to one aspect, the system may cease performing snapshots of files while still collecting particular types of events that can indicate an "unsafe" potential using the entropy detector or other heuristics. According to another aspect, if a session is white-listed, the session can be removed from the white-list after a certain time period.

In another aspect, the IP address associated with the client device 110 is blocked by the file server 102. Additionally, if a particular user uses several client devices, the file server 102 may additionally choose to block the other IP addresses associated with the other client devices, despite their not being malicious sessions initiated from those devices, as a precautionary measure. The file server 102 may add the IP address to a black list, disallowing subsequent remote session connections. According to another aspect, a combination of IP address with other identifying parameters such as User ID (e.g., SID on WINDOWS) are used to define who/what devices are added to the black-list.

According to an exemplary aspect, the applicable network 150 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

Figure 2:
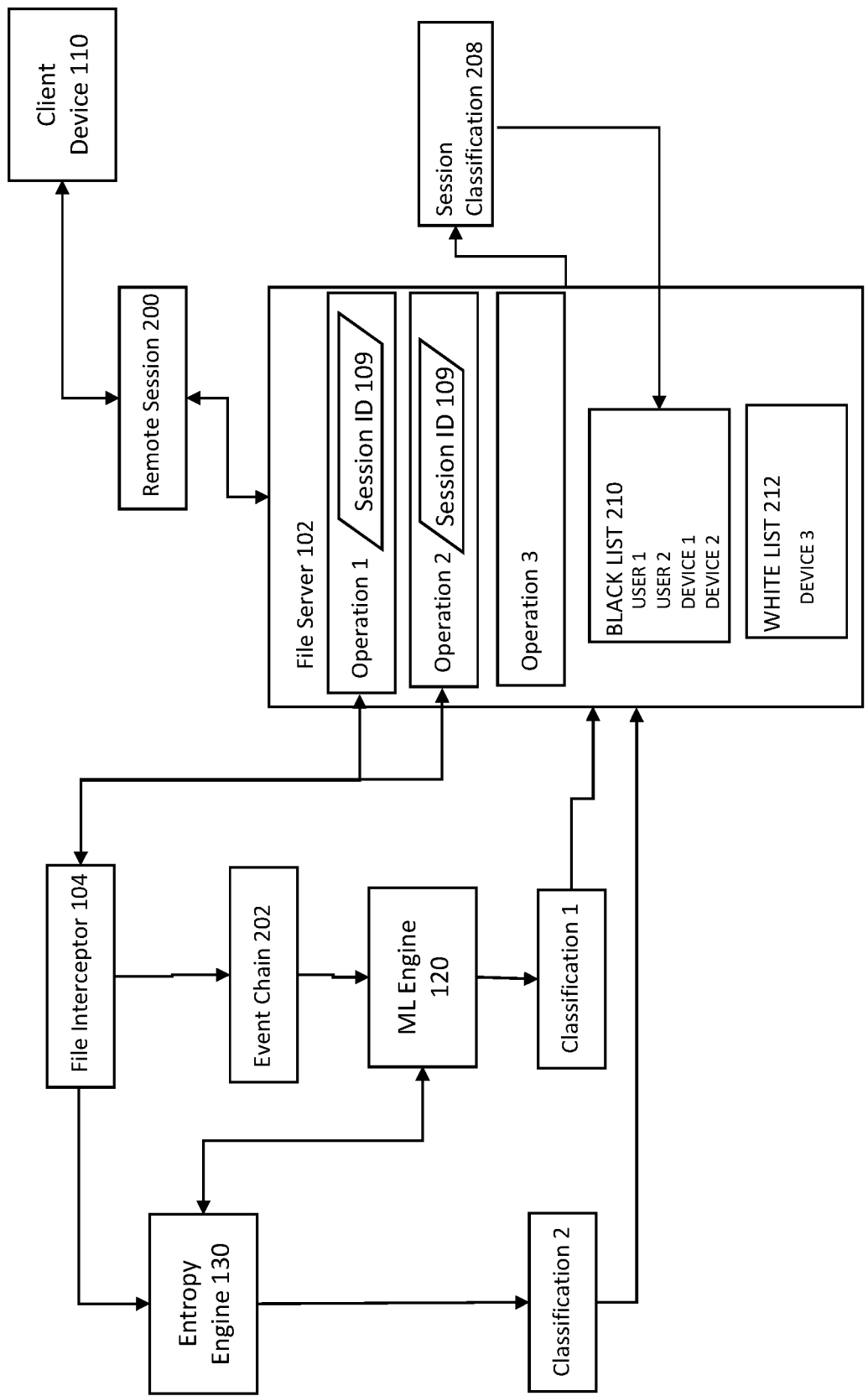
FIG. 2 is a block diagram illustrating the operations of the file interceptor according to an exemplary aspect of the disclosure

FIG. 2 is a block diagram illustrating the operations of the file interceptor 104 according to an exemplary aspect of the disclosure.

According to one aspect, the file interceptor 104 may be a file system filter, e.g. a mini-filter driver. According to FIG. 2, the client device 110 has initiated a remote session 200 with the file server 102. The file server has assigned session Id 109 to each of the operations of the user such as operation 1 and 2. Operation 3 may represent an operation that is not tagged, and therefore associated with another remote session.

The file interceptor 104 tracks each operation that is tagged with session Id 109. In some aspects the file interceptor 104 looks into the log files of the file server 102 to determine which operations belong to the session based on the session Id 109. In other aspects, the file interceptor 104 registers a handler with the operating system of file server 102 that automatically alerts the file interceptor 104 to any operations with a particular tag such as session Id 109. Additionally the file interceptor 104 may monitor and track data that is crucial to security and/or the manipulation of which may indicate that malicious activity is taking place.

The file interceptor 104 continually creates an event chain such as event chain 202 as operations are performed on the file server 102. After a predetermined number of operations are performed, the file interceptor 104 may collect the operations into an event chain 202 and transmit the event chain 202 to the ML engine 120 and the entropy detector 130. As described with reference to FIG. 1, the ML engine 120 generates a "classification 1" based on a trained model of "bad" applications, and another classification based on a trained model of "good" applications. The entropy detector 130, on the other hand, generates a "classification 2" as described above. According to this aspect, a "good" application can be detected as soon as possible so tracking can be stopped. If a "bad" model gives the output of the behavior deviation, the application can be considered "good" with a certain level of confidence. The file server 102 makes a determination of the session classification 208 based on classification 1 and classification 2. In some aspects classification 1 and classification 2 may be weighted as described above with respect to FIG. 1. The file server 102 may add the user or device to a black list 210 based on a dangerous classification, or alternatively add the user and device to a white list 212 of trusted users and devices.

Figure 3:
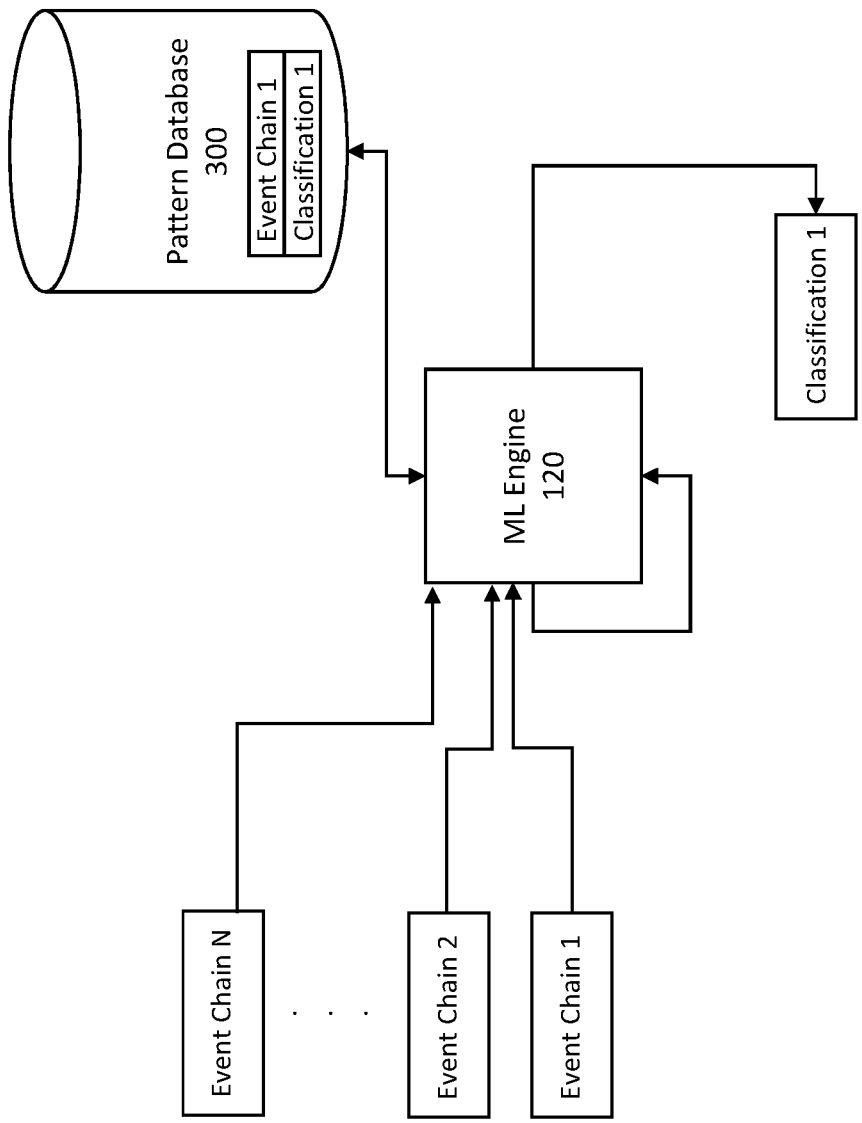
FIG. 3 is a block diagram of the operation of the ML engine in accordance with exemplary aspects of the present disclosure.

FIG. 3 is a block diagram of the operation of the ML engine 120 in accordance with exemplary aspects of the present disclosure.

The ML engine 120 receives, or collects, various event chains 1 to N as shown in FIG. 3. As the ML Engine 120 receives these event chains, the ML engine 120 generates a classification indicating that the events in the event chain are indicative of a session which is dangerous, i.e., malicious software is attempting to perform an attack on the file server 102, or a classification that the session is safe for the file server 102. The classification may take the form of a numerical degree of danger in some aspects.

The ML engine 120 may save each event chain and the generated classification in a pattern database 300. Initially, the classifications may be based on a set of heuristics or rules and policies, so the pattern database 300 may be only sparsely populated. For example, the event chain 1 and the classification 1 are correlated in the pattern database 300. However, after some time more user sessions will be established with the file server 102 and the pattern database 300 will comprise records about different types of event chain patterns, each with their particular classification. Accordingly, when, for example, event chain N is received by the ML engine 120, the ML engine 120 can generate a classification based on a large data set including heuristics and at least N−1 event chains that is significantly more accurate than classification 1, which was based on heuristics and a very small sample set of data.

Figure 4:
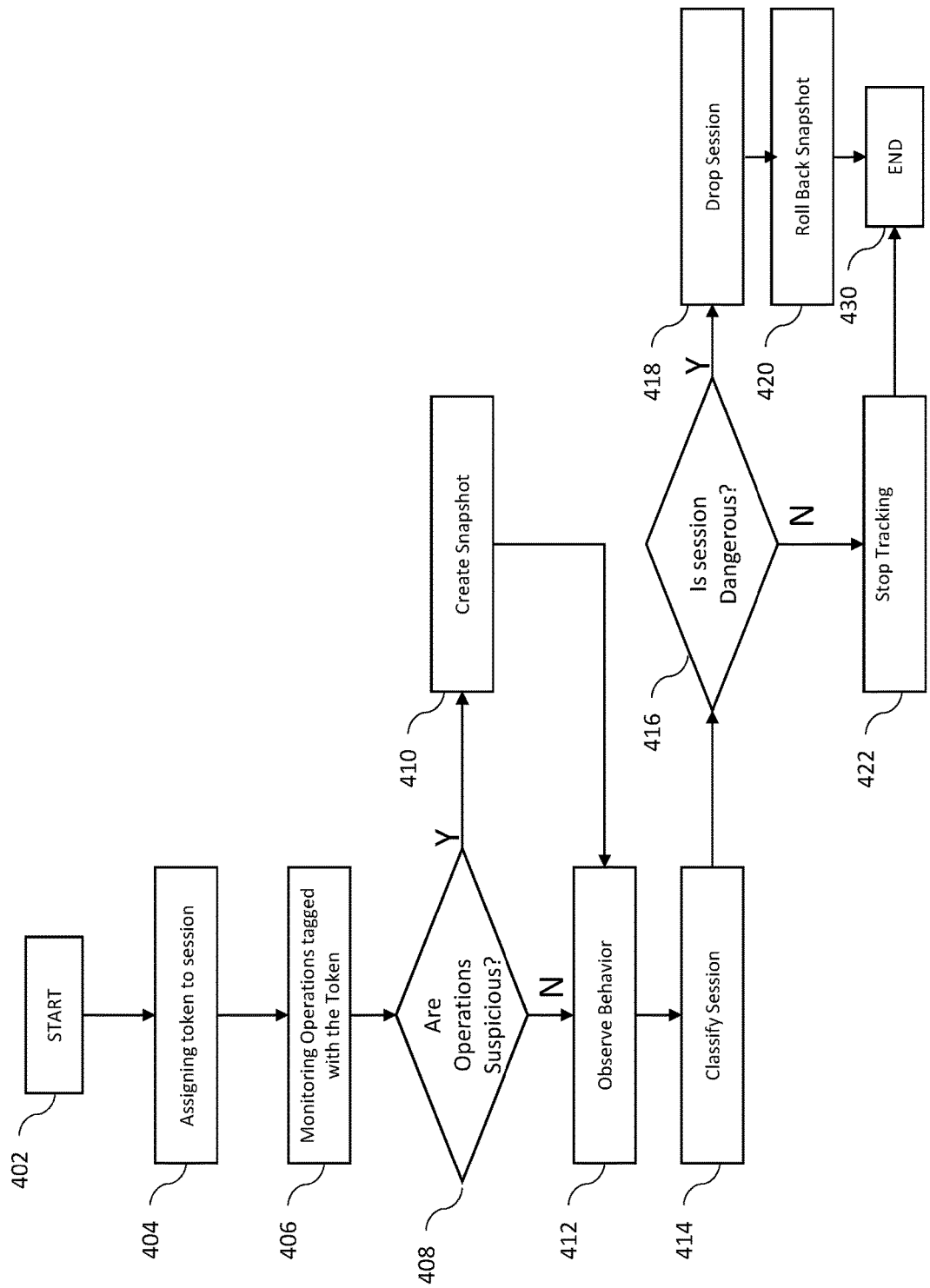
FIG. 4 illustrates a flowchart of a method for protecting a file server from a ransomware attack according to an exemplary aspect.

FIG. 4 illustrates a flowchart of a method 400 for protecting a file server from a ransomware attack according to an exemplary aspect. The method 400 is an exemplary implementation of components of the system 100 as executed by portions of the computer 20 shown in FIG. 5.

The method begins at step 402 and proceeds to step 404. At step 404, the file server 102 detects a User ID and assigns a session Id to a remote session initiated with the file server 102. The user ID identifies a user engaged in the session and a session Id is an identifier used to tag all operations performed during the session as being associated with the session.

The method proceeds to step 406 where the file interceptor 104 detects the remote connection for the session and tags all operations performed during the session with session Id 109, and monitors the tagged operations and data. According to one aspect, the tagging is performed by logging all activity with the session Id as a text string, such that log files can be identified as belonging to a particular session. In another aspect, the file interceptor 104 generates a list of operations being performed associated with the session Id 109. In one aspect, tagging may be done internally within the kernel, and the file server 102 may maintain contexts and lists related to the tagged activity.

At step 408, the file interceptor 104 determines whether the operations that are being monitored are suspicious. For example, deleting files, modifying files or encrypting files may be considered suspicious behavior. If at 408, the file interceptor 104 determines that the operations are suspicious, the file interceptor 104 creates a snapshot and stores the snapshot in snapshot database 108. In some aspects, the file interceptor 104 creates a file snapshot while in other instances a volume-level file snapshot may be created.

The method proceeds to 412 where the ML engine 120 monitors behavior and the entropy detector 130 observes the entropy during the session. The ML engine 120 analyzes the event chain from the file interceptor 104 to recognize patterns within the events and determine whether the pattern is similar to patterns which indicate a dangerous session or a safe session. The entropy detector 130 determines whether entropy of the files (e.g., the contents of the files) has grown during the session. If entropy has grown, the session is marked as being dangerous or at least potentially the result of encryption software. At 414, the file server 102 determines whether the session is dangerous or safe based on the classifications of the ML engine 120 and the entropy detector 130, which in some aspects may each be given a predefined weighting determined by an administrator, or calculated by previous success of the ML engine 120 and the entropy detector 130.

If, at 416, the session was determined to be safe in 414, the file server 102 directs the file interceptor 104 to stop tracking behavior during the session and stop creating snapshots. Additionally, the file server 102 may mark the session as "trusted" and store the pattern in storage for future reference by the ML engine 120.

Alternatively at 416, if the session is found dangerous at 414, the method proceeds to 318, where the file server 102 may drop or interrupt the session using the underlying operating system or network commands. In this aspect, the file server 102 may have found that the combination of a degree of danger of the session and the level of entropy/encryption is equal or greater then a predetermined threshold value. The predetermined threshold value may be obtained experimentally, or analyzed and determined to be particularly useful at a particular value, according to an administrator, the ML engine 120 or the like. At 418, the file server 102 may also block the IP address, other parameters such as a user Id, or a combination of both, of the client device initiating the remote session, and may also block other related combinations of IP addresses and other parameters, such as User Id from accessing the file server. At 420, the file server 102 restores any data that was affected using snapshots from the snapshot database 108.

The method terminates at 430.

Figure 5:
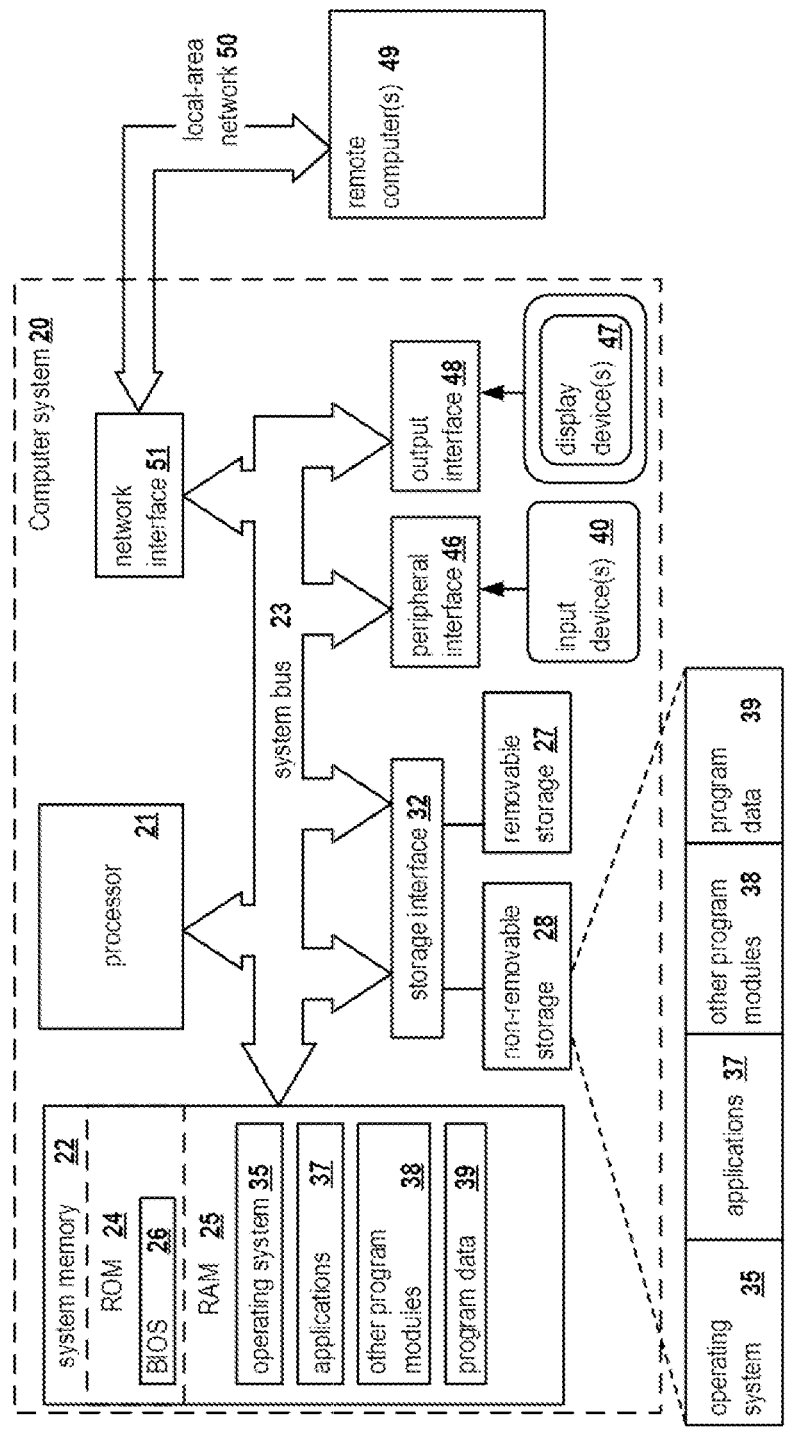
FIG. 5 illustrates a block diagram of an example of a general-purpose computer system on which the disclosed system and method can be implemented according to an example aspect.

FIG. 5 is a block diagram illustrating a computer system 20 on which aspects of systems and methods for protection against ransomware attacks may be implemented in accordance with an exemplary aspect. It should be noted that the computer system 20 can correspond to the file server 102 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for protecting a file server from a ransomware attack, comprising:
   assigning a session identifier to a remote session initiated with the file server;
   monitoring operations on the file server associated with the session identifier;
   determining whether the operations comprise any operations that are suspicious according to a policy;
   creating a volume-level snapshot of files on the file server when the operations on the file server comprise any operations that are deemed suspicious;
   determining that encryption of the data is occurring when entropy of the monitored data is growing faster than the predetermined threshold rate;
   classifying the remote session as having a calculated degree of danger when the operations match operations contained in previously observed suspicious behavior patterns identified using machine learning applied to operations on the file server over a predetermined period of time;
   interrupting the remote session when a combination of the degree of danger and the entropy is greater than a predetermined threshold value; and restoring the data on the file server using the volume-level snapshot to a state prior to the encryption and dangerous activity.

2. The method of claim 1, further comprising:
determining that the file operations are suspicious when the operations comprise one or more of modifying data on the file server, deleting data on the file server, creating data no the file server, and/or encrypting data on the file server.

3. The method of claim 1, further comprising:
adding a user identifier (user Id) of a user initiating the remote session to a black list; and
blocking future sessions associated with the user Id from initiating a session with the file server.

4. The method of claim 3, further comprising:
adding an IP address of a client device in combination with the user Id to the black list.

5. The method of claim 1, further comprising:
weighting the degree of danger at a first predetermined weight and the determination of encryption at a second predetermined weight;
determining the combination for interrupting the session based on the degree of danger at the first predetermined weight and the entropy level at the second predetermined.

6. The method of claim 1, further comprising:
collecting an event chain based on the operations; and
generating a behavior pattern according to the event chain.

7. The method of claim 6, wherein classifying the remote session further comprises:
comparing the behavior pattern in the remote session with stored behavior patterns; and
determining a classification of the behavior patterns based on a classification of a similar behavior pattern from the stored behavior patterns.

8. The method of claim 1, wherein determining whether the operations comprise operations that are suspicious according to the policy further comprises:
generating a first classification of the operations based on a trained model of bad applications; and
generating a second classification of the operations based on a trained model of good applications.

9. The method of claim 8, further comprising:
generating a third classification of the operations as dangerous based on an entropy comparison with a previous state of data affected by the operations, wherein the entropy comparison indicates an increase in the entropy of the data.

10. The method of claim 9, further comprising:
verifying the first classification and the second classification based on the third classification.

11. A system for protecting a file server from a ransomware attack, comprising:
a hardware processor configured to:
assign a session identifier to a remote session initiated with the file server;
monitor operations on the file server associated with the session identifier;
determine whether the operations comprise any operations that are suspicious according to a policy;
create a volume-level snapshot of files on the file server when the operations on the file server comprise any operations that are deemed suspicious;
determine that encryption of the data is occurring when entropy of the monitored data is growing faster than the predetermined threshold rate;
classify the remote session as having a degree of danger when the operations match operations contained in previously observed suspicious behavior patterns identified using machine learning applied to operations on the file server over a predetermined period of time;
interrupt the remote session when a combination of the degree of danger and the entropy is greater than predetermined threshold value; and
restore data on the file server using the volume-level snapshot to a state prior to the encryption and dangerous activity.

12. The system of claim 11, wherein the hardware processor is further configured to:
determine that the file operations are suspicious when the operations comprise one or more of modifying data on the file server, deleting data on the file server, and/or encrypting data on the file server.

13. The system of claim 11, wherein the hardware processor is further configured to:
add a user identifier (user Id) of a user initiating the remote session to a black list; and
block future sessions associated with the user Id from initiating a session with the file server.

14. The system of claim 13, wherein the hardware processor is further configured to:
add an IP address of a client device in combination with the user Id to the black list.

15. The system of claim 11, wherein the hardware processor is further configured to:
weight the degree of danger at a first predetermined weight and the determination of encryption at a second predetermined weight;
determine the combination for interrupting the session based on the degree of danger at the first predetermined weight and the entropy level at the second predetermined.

16. The system of claim 11, wherein the hardware processor is further configured to:
collect an event chain based on the operations; and
generate a behavior pattern according to the event chain.

17. The system of claim 16, wherein classifying the remote session further comprises:
compare the behavior pattern in the remote session with stored behavior patterns; and
determine a classification of the behavior patterns based on a classification of a similar behavior pattern from the stored behavior patterns.

18. The system of claim 11, wherein the hardware processor is further configured to determine whether the operations comprise operations that are suspicious according to the policy by:
generating a first classification of the operations based on a trained model of bad applications; and
generating a second classification of the operations based on a trained model of good applications.

19. The system of claim 18, wherein the processor is further configured to:
generate a third classification of the operations as dangerous based on an entropy comparison with a previous state of data affected by the operations, wherein the entropy comparison indicates an increase in entropy of the data.

20. The system of claim 19, further comprising:
verify the first classification and the second classification based on the third classification.

21. A non-transitory computer-readable medium, storing instructions thereon for protecting a file server from a ransomware attack, the instructions comprising:
- assigning a session identifier to a remote session initiated with the file server;
- monitoring operations on the file server associated with the session identifier;
- determining whether the operations comprise any operations that are suspicious according to a policy;
- creating a volume-level snapshot of files on the file server when the operations on the file server comprise any operations that are deemed suspicious;
- determining that encryption of the data is occurring when entropy of the monitored data is growing faster than the predetermined threshold rate;
- classifying the remote session as having a calculated degree of danger when the operations match operations contained in previously observed suspicious behavior patterns identified using machine learning applied to operations on the file server over a predetermined period of time;
- interrupting the remote session when a combination of the degree of danger and the entropy is greater than a predetermined threshold value; and
- restoring the data on the file server using the volume-level snapshot to a state prior to the encryption and dangerous activity.

* * * * *